(12) United States Patent
Kim

(10) Patent No.: US 12,433,395 B2
(45) Date of Patent: Oct. 7, 2025

(54) TOOTHBRUSH FOR PROMOTING PLAQUE REMOVAL AND MANUFACTURING METHOD THEREFOR

(71) Applicant: PROXIHEALTHCARE INC., Ulsan (KR)

(72) Inventor: Young Wook Kim, Seoul (KR)

(73) Assignee: PROXIHEALTHCARE INC., Ulsan (KR)

( * ) Notice: Subject to any disclaimer, the term of this patent is extended or adjusted under 35 U.S.C. 154(b) by 565 days.

(21) Appl. No.: 17/775,611

(22) PCT Filed: Jul. 14, 2020

(86) PCT No.: PCT/KR2020/009243
§ 371 (c)(1),
(2) Date: May 10, 2022

(87) PCT Pub. No.: WO2021/096022
PCT Pub. Date: May 20, 2021

(65) Prior Publication Data
US 2022/0395087 A1    Dec. 15, 2022

(30) Foreign Application Priority Data

Nov. 11, 2019    (KR) .......................... 10-2019-0143432

(51) Int. Cl.
*A46B 15/00* (2006.01)
*A46B 9/04* (2006.01)
(Continued)

(52) U.S. Cl.
CPC ............ *A46B 15/0022* (2013.01); *A46B 9/04* (2013.01); *A61N 1/0476* (2013.01); *A61N 1/18* (2013.01)

(58) Field of Classification Search
CPC ................................ A61N 1/0476; A61N 1/18
See application file for complete search history.

(56) References Cited

U.S. PATENT DOCUMENTS 11,103,058 B2 *  8/2021  Wainless ................ A61Q 11/00
2011/0016648 A1 *  1/2011  Kunita ................ A61C 17/221
                                                    15/22.1
(Continued)

FOREIGN PATENT DOCUMENTS

JP    07-044887 B2    5/1995
JP    10-080324 A     3/1998
(Continued)

OTHER PUBLICATIONS

KR-101834665-B1—English Machine Translation (Year: 2018).*
KR-20130078612-A—English Machine Translation (Year: 2013).*

*Primary Examiner* — Marc Carlson
(74) *Attorney, Agent, or Firm* — NKL LAW; Jae Youn Kim

(57) ABSTRACT

A toothbrush for promoting plaque removal, and a manufacturing method therefor are proposed. The toothbrush includes: a head part in which elements for cleaning teeth are arranged; a first electrode on the head part; a second electrode on the head part, the second electrode being spaced a predetermined distance from the first electrode and grounded; and a voltage supply part configured to superpose alternating current (AC) voltage and direct current (DC) voltage and apply the AC voltage and the DC voltage together to the first electrode.

18 Claims, 13 Drawing Sheets

(51) Int. Cl.
*A61N 1/04* (2006.01)
*A61N 1/18* (2006.01)

(56) References Cited

U.S. PATENT DOCUMENTS

| | | | |
|---|---|---|---|
| 2012/0233790 A1* | 9/2012 | Uchida | A46B 15/0024 |
| | | | 15/207.2 |
| 2016/0338814 A1* | 11/2016 | Cho | A46B 15/0024 |
| 2018/0368566 A1* | 12/2018 | Wainless | A46B 9/04 |
| 2018/0369567 A1* | 12/2018 | Wainless | A61C 17/3481 |

FOREIGN PATENT DOCUMENTS

| | | | | |
|---|---|---|---|---|
| JP | 2010-022426 A | | 2/2010 | |
| KR | 20130078612 A | * | 7/2013 | |
| KR | 10-1646874 B1 | | 8/2016 | |
| KR | 101834665 B1 | * | 3/2018 | |
| KR | 20230054044 A | * | 4/2023 | |
| WO | WO-9210113 A1 | * | 6/1992 | ......... A46B 15/0002 |
| WO | 2011-140058 A1 | | 11/2011 | |
| WO | WO-2013042307 A1 | * | 3/2013 | ......... A46B 15/0022 |
| WO | WO-2013084863 A1 | * | 6/2013 | ......... A46B 15/0024 |
| WO | WO-2018127921 A1 | * | 7/2018 | |
| WO | WO-2021096022 A1 | * | 5/2021 | ......... A46B 15/0022 |

\* cited by examiner

TOOTHBRUSH FOR PROMOTING PLAQUE REMOVAL AND MANUFACTURING METHOD THEREFOR

TECHNICAL FIELD

This invention relates to a toothbrush for promoting plaque removal and a method for manufacturing the same, and more particularly, to a toothbrush for promoting plaque removal configured to remove plaque by applying an electric field, and a method for manufacturing the same.

BACKGROUND ART

The biofilm refers to a film formed by bacteria to protect themselves when they form a community. In addition, a biofilm formed by deposition of saliva and minerals such as calcium (Ca) and phosphorus (P) in the space between teeth and gums is called plaque. Plaque is formed when microorganisms, gingival exfoliation cells, white blood cells, and food are attached to the sterile thin membrane.

Bacteria proliferate in the oral cavity where plaque is generated, and the proliferated bacteria may cause serious inflammation in the tooth tissue. Therefore, inflammation generated in dental tissue due to plaque, such as, tooth decay, can be treated when 500 to 1000 times or more the amount of the antibiotic administered to the bacterial infection is administered to the tooth. In addition, in order to remove the plaque formed in the form of a bacterial biofilm, a surgical operation must be performed, and a large amount of antibiotics must be administered.

Such a surgical operation may not only impose a cost burden on the patient, but also have spatial and temporal limitations in that he/she must continuously visit a hospital for treatment. Additionally, as high-dose antibiotic administration must be used in combination to achieve a therapeutic effect, secondary problems such as antibiotic resistance may be caused.

Therefore, there has been a continuous need for the development of a new plaque removal system capable of effectively removing plaque without temporal and spatial constraints.

The background art of this invention has been prepared to facilitate understanding of this invention. It should not be construed as an admission that the matters described in the background art of this invention exist as prior art.

DISCLOSURE

Technical Problem

Meanwhile, as a method to address the problems of the conventional plaque removal system as described above, a method of lowering the concentration of antibiotics by applying an electric field to the teeth so that the bacterial biofilm is not formed on the tooth surface to weaken the structure of the plaque is proposed.

In this case, the treatment method of applying an electric field may be a method of removing plaque by inducing hydrolysis of water by applying a high voltage to the tooth surface. However, problematically, the method of removing plaque with a voltage high enough to cause hydrolysis of water may cause an electric shock to a human body and may cause pains.

The inventors of this invention have attempted to develop a new plaque removal system capable of effectively removing plaque while at the same time alleviating the risk of electric shock and the pain causing.

Consequently, the inventors of this invention were able to develop a plaque removal system capable of controlling the intensity of the electric field applied to the teeth.

More specifically, the inventors of this invention found that, when applying an alternating current (AC) voltage and a direct current (DC) voltage together while superimposing the AC voltage and the DC voltage, an electric field harmless to the human body was applied to the teeth, and plaque was also effectively removed.

In this regard, the inventors of this invention were able to employ the plaque removal system to a toothbrush as a method for effectively removing plaque.

In particular, the inventors of this invention tried to employ an electrode capable of supplying two types of voltages to a toothbrush, and thus it could be expected that plaque removal could be performed in daily life without spatial and temporal restrictions.

Furthermore, the inventors of this invention could recognize that by providing a toothbrush capable of removing plaque, it could contribute to reduction of treatment cost.

Meanwhile, the inventors of this invention were able to find the structure and arrangement of electrodes in a toothbrush capable of supplying an electric field to teeth at high efficiency, i.e., increasing the electric field density.

Therefore, the problem to be addressed by this invention is to provide a toothbrush for promoting plaque removal including a first electrode and a second electrode arranged on a head portion, and a voltage supply unit configured to apply an AC voltage and a DC voltage together.

Another problem to be addressed by this invention is to provide a method of manufacturing a toothbrush for promoting plaque removal which is configured to dispose a first electrode and a second electrode spaced apart from the first electrode by a predetermined distance and grounded, and dispose a voltage supply unit configured to apply an AC voltage and a DC voltage together.

The drawbacks which this invention addresses are not limited to the aforementioned ones, but other drawbacks which can be solved by this invention will become apparent to those skilled in the art from the description below.

Technical Solution

In order to address the problems as described above, there is provided a toothbrush for promoting plaque removal according to an embodiment of this invention. In this case, the toothbrush may include a head portion on which elements for cleaning teeth are arranged, a first electrode on the head portion, a second electrode on the head portion, wherein the second electrode is spaced apart from the first electrode by a predetermined distance, and is grounded, and a voltage supply unit configured to apply an alternating current (AC) voltage and a direct current (DC) voltage together by superimposing the AC voltage and the DC voltage on the first electrode.

According to a feature of the invention, the voltage supply unit may be configured to apply together a DC voltage of 0.0001 V to 0.82 V and an AC voltage having an amplitude of 0.25 V to 0.82 V at a frequency of 0.1 MHz to 100 MHz.

According to another feature of the invention, the first electrode and the second electrode may have pillar structures respectively that are identical or not identical to each other, and a plurality of first electrodes and a plurality of second electrodes are respectively arranged on the head portion at predetermined intervals.

According to still another feature of the invention, the number of the first electrodes may be plural and the number of the second electrode may be plural, and at least one of a plurality of first electrodes and at least one of a plurality of second electrodes may have rectangular pillar structures in which one side surface has a length greater than that of another side surface, and may be disposed at the center of the head portion. In this regard, the remaining electrode of the plurality of first electrodes and the remaining electrode of the plurality of second electrodes may have circular pillar structures, and may be respectively disposed on a peripheral portion of the head portion.

According to still another feature of the invention, the first electrode and the second electrode may have rectangular pillar structures identical to each other, in which the length of one side surface is greater than that of another side surface, and may be respectively disposed at the center of the head portion.

According to still another feature of the invention, the number of the first electrodes may be plural, and the number of the second electrodes may be plural, and the first electrodes and the second electrodes may have circular pillar structures identical to each other, and may be respectively disposed on a peripheral portion of the head portion at predetermined intervals.

According to still another feature of the invention, one of the first electrode or the second electrode may have a rectangular pillar structure in which the length of one side surface is greater than that of another side surface, and may be disposed at the center of the head portion. In this case, the other one of the first electrode and the second electrode may have a circular pillar structure, and may be disposed in a peripheral portion of the head portion.

According to still another feature of the invention, the pillar may be a pillar with a concave top surface.

According to still another feature of the invention, the width or diameter of the pillar may be 0.1 to 10 mm.

According to still another feature of the invention, a bristle portion disposed in a different region on the head portion from those of the first electrode and the second electrode, and having a height greater than that of the first electrode or the second electrode may be further included.

According to still another feature of the invention, the predetermined interval may be 0.1 to 20 mm, and the height of the first electrode or the second electrode may be 1 to 20 mm.

According to still another feature of the invention, a handle portion from which one end of the head portion extends may be further included. In this case, the voltage supply unit may be disposed on the handle portion.

According to still another feature of the invention, an insulating layer configured to surround at least a partial surface of the first electrode or the second electrode from the outside may be further included. In this case, the insulating layer may be formed of at least one of $Al_2O_3$, $SiO_2$, $Si_3N_4$, silicone, Teflon, and plastic.

According to still another feature of the invention, the toothbrush according to an embodiment of this invention may further include a light irradiator disposed in a different region on the head portion from those of the first electrode and the second electrode.

In order to address the problems as described above, there is provided a method of manufacturing a toothbrush for promoting plaque removal according to another embodiment of this invention. The method includes disposing a first electrode and a grounded second electrode spaced apart from the first electrode by a predetermined distance on a head portion on which an element for cleaning teeth is arranged, and disposing a voltage supply unit configured to apply an alternating current (AC) voltage and a direct current (DC) voltage together by superimposing the AC voltage and the DC voltage on the first electrode.

According to a feature of the invention, after the step of disposing the second electrode, disposing a bristle portion having a height greater than that of the first electrode or the second electrode in a region on the head portion different from those of the first electrode and the second electrode may be further included.

According to another feature of the invention, the step of disposing the second electrode may include disposing at least one substrate of a printed circuit board (PCB), a printed wiring board (PWB), and a flexible PCB (FPCB) on the head portion, and disposing the first electrode and the second electrode on the at least one substrate.

According to still another feature of the invention, the first electrode and the second electrode may have pillar structures respectively that are identical or not identical to each other. In this case, the step of disposing the second electrode may include arranging each of a plurality of first electrodes and a plurality of second electrodes on the head portion at predetermined intervals.

According to still another feature of the invention, the number of the first electrodes may be plural and the number of the second electrode may be plural, and at least one of a plurality of first electrodes and at least one of a plurality of second electrodes may have rectangular pillar structures in which one side surface has a length greater than that of another side surface. Further, a remaining electrode of the plurality of first electrodes and a remaining electrode of the plurality of second electrodes may have circular pillar structures. In this case, the step of disposing the second electrode may include disposing the first electrode and the second electrode having the rectangular pillar structures at the center of the head portion, respectively, and disposing the first electrode and the second electrode having the circular pillar structures on the peripheral portion of the head portion, respectively.

According to still another feature of the invention, the first electrode and the second electrode may have rectangular pillar structures in which one side surface has a length greater than that of another side surface. In this case, the step of disposing the second electrode may include disposing the first electrode and the second electrode having the rectangular pillar structures identical to each other at the center of the head portion, respectively.

According to still another feature of the invention, a number of the first electrodes may be plural, and a number of the second electrodes may be plural, and the first electrode and the second electrode may have circular pillar structures identical to each other. In this case, the step of disposing the second electrode may include disposing the first electrode and the second electrode having the circular pillar structures identical to each other on the peripheral portion of the head portion at a predetermined interval, respectively.

According to still another feature of the invention, one of the first electrode or the second electrode may have a rectangular pillar structure in which the length of one side surface is greater than that of another side surface, and the other one of the first electrode or the second electrode may have a circular pillar structure. In this case, the step of disposing the second electrode may include disposing one of the first electrode and the second electrode having the rectangular pillar structure at the center of the head portion, and disposing the other one of the first electrode and the second electrode having the circular pillar structure on the peripheral portion of the head portion.

Advantageous Effects

This invention can effectively alleviate the problems of the conventional toothbrush for promoting plaque removal, such as causing an electric shock to the human body by applying a strong current, causing pains, or the like.

More specifically, a toothbrush for promoting plaque removal according to an embodiment of this invention is configured to apply an AC voltage and a DC voltage together by superimposing the AC voltage and the DC voltage, and thus it can apply to the teeth an electric field which is harmless to the human body, and can also remove plaque effectively.

In particular, as this invention provides a toothbrush capable of supplying an electric field according to two types of voltages, a user can perform plaque removal in daily life without spatial and temporal restrictions.

Accordingly, this invention can effectively contribute to the reduction of the treatment cost accompanying the treatment of inflammation caused by the formation of plaque.

Furthermore, this invention can effectively provide various structures and arrangements of electrodes that can apply an electric field to the teeth at high efficiency, that is, increase the electric field density.

Additionally, as this invention provides a toothbrush including a light irradiator that provides a whitening effect, the user can more easily perform tooth whitening management.

The effects according to this invention are not limited to the contents exemplified above, but more various effects are included in the present specification.

MODES OF THE INVENTION

Figure 1:
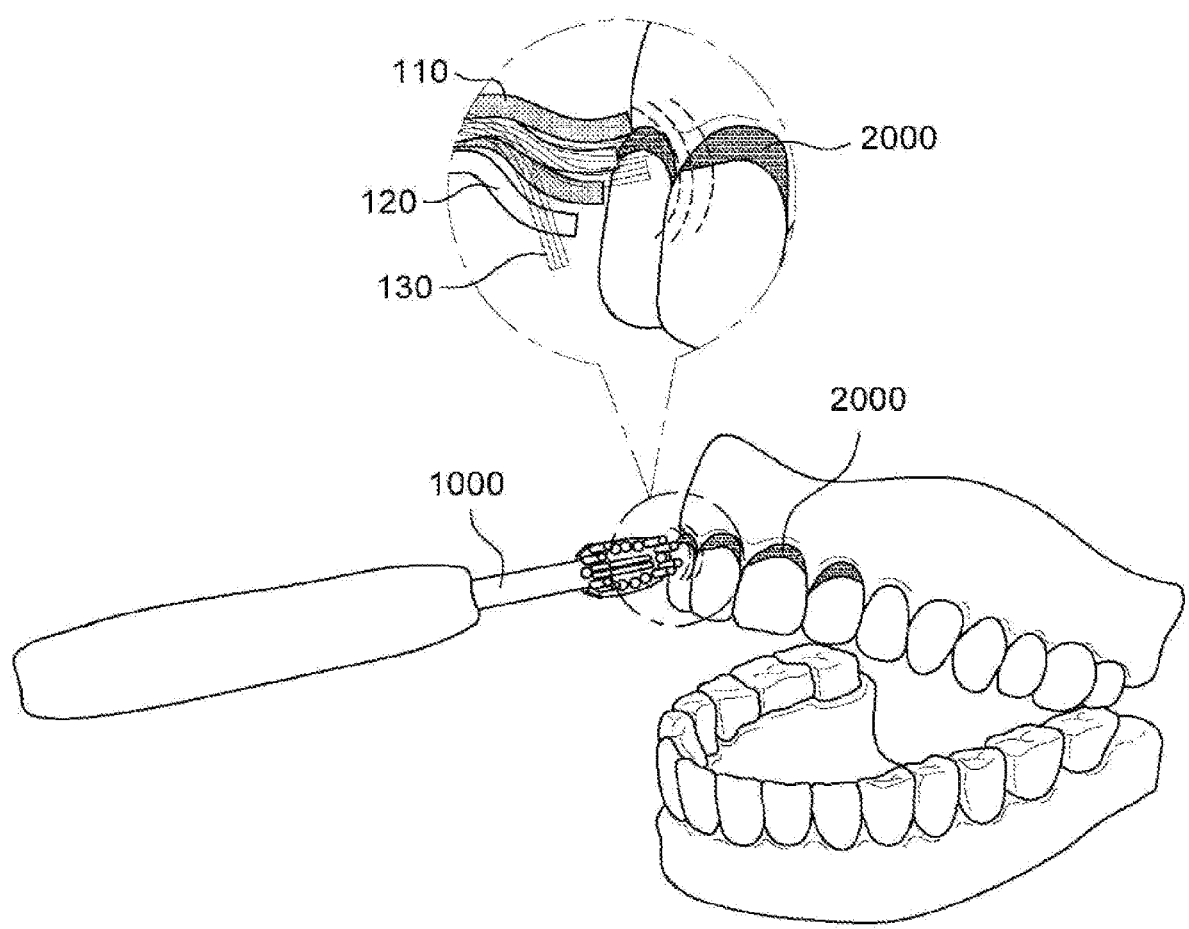
FIG. 1 shows, by way of example, the configuration of a plaque removal system based on a toothbrush for promoting plaque removal according to an embodiment of this invention.

Advantages of the invention, and methods of achieving them will become apparent with reference to the embodiments described below in detail in conjunction with the accompanying drawings. However, this invention is not limited to the embodiments disclosed below, but will be implemented in a variety of different forms, and the present embodiments are only provided so that the invention of this invention is complete, and to fully inform those of ordinary skill in the art to which this invention belongs, the scope of the invention, and the invention is only defined by the scope of the claims.

The shapes, sizes, proportions, angles, numbers, etc. disclosed in the drawings for explaining the embodiments of this invention are illustrative, and thus this invention is not limited to the illustrated matters. Also, when explaining the invention, if it is determined that a detailed description of a related known technology may unnecessarily obscure the subject matter of this invention, the detailed description thereof will be omitted. Throughout the specification and claims, the terms "comprise", "include", "have", "consist", and their variations mentioned should be construed as meaning "including but not limited to" unless 'only' is used. When a component is expressed in the singular form, it should be understood to encompass its plural form unless otherwise explicitly stated.

In interpreting the components, it is construed as including an error range even if there is no separate explicit description.

Features of various embodiments of this invention may be partially or overall coupled to or combined with each other, and may be variously inter-operated with each other and driven technically as those skilled in the art can sufficiently understand. The embodiments of this invention may be carried out independently from each other, or may be carried out together in co-dependent relationship.

For clarity of interpretation of this invention, terms used herein will be defined below.

As used herein, the term "head portion" is a structure that is inserted into the oral cavity to substantially clean teeth, and on which a first electrode, a second electrode, and further bristles may be disposed.

In this case, the head portion may be made of polypropylene, but is not limited thereto, and may be made of a variety of plastics, silicones, wood, and the like.

As used herein, the terms "first electrode" and "second electrode" refer to conductive electrodes having electrical conductivity.

In this case, the first electrode and the second electrode may be formed of at least one metal of Au, Ni, Cu, Zn, Fe, Al, Ti, Pt, Hg, Ag, Pb, and alloys thereof. Furthermore, the electrode may be made of at least one organic material selected from carbon black, carbon graphite, graphene, fullerene, and carbides. However, this invention is not limited thereto, but the first electrode and the second electrode may be a conductor made of an aluminum alloy, plastic chrome plating, conductive silicone, or a conductive polymer.

In this case, the first electrode may be an electrode having a positive charge, and the second electrode may mean a grounded electrode. However, this invention is not limited thereto.

According to a feature of this invention, the first electrode and the second electrode may respectively have a polygonal or circular pillar structure that is identical or not identical to each other, and may be disposed on the head portion at a predetermined interval.

However, the first electrode and the second electrode may be formed on the head portion of the toothbrush in more various forms as long as an electric field is applied to the teeth.

In this case, the "predetermined interval" may be 0.1 to 20 mm. More specifically, when the first electrode and the second electrode are arranged on the head at intervals of 0.1 to 20 mm, a stable voltage of 0.82V or less may be generated, and an electric field of 1.25 V/Cm or less may be applied to the teeth. Meanwhile, when the first electrode and the second electrode are disposed at an interval of 20 mm or more on the head portion, a voltage exceeding 0.82 V may be generated, and an electric field exceeding 1.25 V/Cm may be applied to the teeth, which may cause pains to the user.

As used herein, the term "pillar structure" may refer to a columnar shape of which the top and bottom surfaces are polygonal or circular, and further, a hemispherical shape of which the top surface is concave.

For example, the first electrode or the second electrode may have a circular pillar structure of a circular column, a rectangular pillar structure of a rectangular column, or a hemispherical shape with a concave top surface.

In this case, the diameter or width of the pillar may be 0.1 to 10 mm. For example, when the diameter or width of the first electrode or the second electrode having the pillar structure exceeds 10 mm, it may cause the feeling of irritation to the user.

Preferably, the diameter of the first electrode and the second electrode is 0.1 mm, and they may be formed of a group of a plurality of strands. Accordingly, the first electrode and the second electrode may have a larger surface area than an electrode having a larger diameter, so that an electric field can be applied to the tooth at high efficiency. Furthermore, it may also perform the role of bristles of a toothbrush.

According to another feature of this invention, the height of the first electrode or the second electrode of the pillar structure may be 1 to 20 mm.

As used herein, the term "bristle portion" may refer to bristles formed on the head portion.

In this case, the height of the bristle portion may be greater than the above-described heights of the first electrode and the second electrode. However, the height of the bristle portion is not limited thereto, but may vary depending on the target area to which the electric field is applied. For example, when the height of the bristle portion is greater than those of the first electrode and the second electrode, the electric field may be concentrated on the lower surface of the head portion. Furthermore, when the height of the bristle portion is less than those of the first electrode and the second electrode, the electric field may be concentrated at the tip of the bristle portion, that is, a portion adjacent to the teeth. Additionally, when the height of the bristle portion is equal to those of the first electrode and the second electrode, the electric field may be distributed in all regions.

According to another feature of this invention, the bristle portion may be detachable on the head portion. However, this invention is not limited thereto.

As used herein, the term "voltage supply unit" may refer to a unit that is connected to the first electrode or the second electrode and applies both an AC voltage and a DC voltage to the teeth.

According to a feature of this invention, the voltage supply unit may be configured to apply together a DC voltage of 0.0001V to 0.82V and an AC voltage having an amplitude of 0.25V to 0.82V at a frequency of 0.1 MHz to 100 MHz. However, the voltage supply unit is not limited to the foregoing, but may be configured to apply a voltage of 0.82V or less to the first electrode and/or the second electrode.

According to another feature of this invention, the voltage supply unit may be configured to control the total amount of energy provided to the teeth through application of AC voltage and DC voltage to 1 nJ to 10 nJ. In this case, the voltage supply unit may be connected to a control unit configured to control the voltage applied to the teeth, or the first electrode and the second electrode.

As a result, the first electrode or the second electrode may form an electric field based on the superimposed voltage of the AC voltage and the DC voltage applied by the voltage supply unit.

Meanwhile, the voltage supply unit may be constructed with an integrated circuit that receives electric energy in a magnetic resonance manner from an external power source, or may be a wireless battery formed with a battery cell constructed with a nickel cadmium battery, a nickel metal hydrogen battery, a lithium ion battery, or a lithium ion polymer battery.

As used herein, the term "insulating layer" may be an intermediate insulator of a coating layer formed on the surface of the first electrode or the second electrode.

For example, the insulating layer may be formed of at least one selected from a group including, but not limited to, $Al_2O_3$, $SiO_2$, $Si_3N_4$, silicone, Teflon, and plastic.

Hereinafter, with reference to FIG. 1, based on a toothbrush for promoting plaque removal according to an embodiment of this invention, a plaque removal system will be described in detail.

FIG. 1 shows, by way of example, the configuration of a plaque removal system based on a toothbrush for promoting plaque removal according to an embodiment of this invention.

Referring to the plaque removal system 10000 of FIG. 1, the toothbrush 1000 for promoting plaque removal according to an embodiment of this invention applies an electric field to the teeth 2000 on which the plaque is formed, so that the plaque formed on the tooth 2000 surface can be removed.

More specifically, the toothbrush 1000 for promoting plaque removal according to an embodiment of this invention has a bristle portion 130 which is formed on a head portion together with a first electrode 110 and a second electrode 120 connected to a voltage supply unit for supplying AC voltage and DC voltage together.

Accordingly, when a user brushes his or her teeth, an electric field generated according to the voltage supplied from the voltage supply unit may be applied to the teeth 2000. In this case, even without direct friction between the first electrode 110 and the second electrode 120, the electric field generated inside the toothbrush can be applied to the teeth 2000. As a result, the plaque structure formed on the tooth 2000 can be destroyed by the applied electric field. Furthermore, when the antibiotic is applied, the molecular movement of the antibiotic becomes active by the electric field, so that the penetration of the antibiotic into the plaque can be promoted, thereby effectively removing the plaque.

Hereinafter, with reference to FIGS. 2A to 2D, the structure of the toothbrush for promoting plaque removal according to an embodiment of this invention will be described.

Figure 2A:
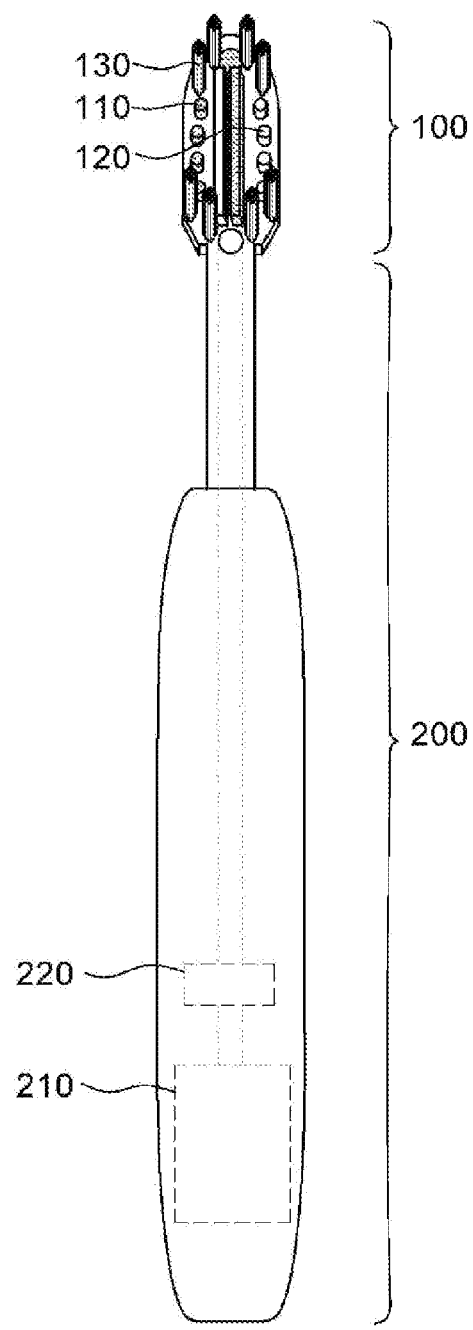
FIGS. 2A to 2D show, by way of example, toothbrushes for promoting plaque removal and their configurations according to an embodiment of this invention.

FIGS. 2A to 2€ 2D show, by way of example, the toothbrushes for promoting plaque removal and their configurations according to an embodiment of this invention.

First, referring to FIG. 2A, the toothbrush 1000 for promoting plaque removal is largely composed of a head portion 100 in which elements for cleaning teeth are arranged, and a handle portion 200 for handling the toothbrush.

More specifically, two types of electrodes 110, 120, that is, a plurality of first electrodes 110 and a plurality of second electrodes 120, are formed on the head portion 100, and a plurality of bristle portions 130 is formed in a region different from those of the first electrodes 110 and the second electrodes 120.

Figure 2B:
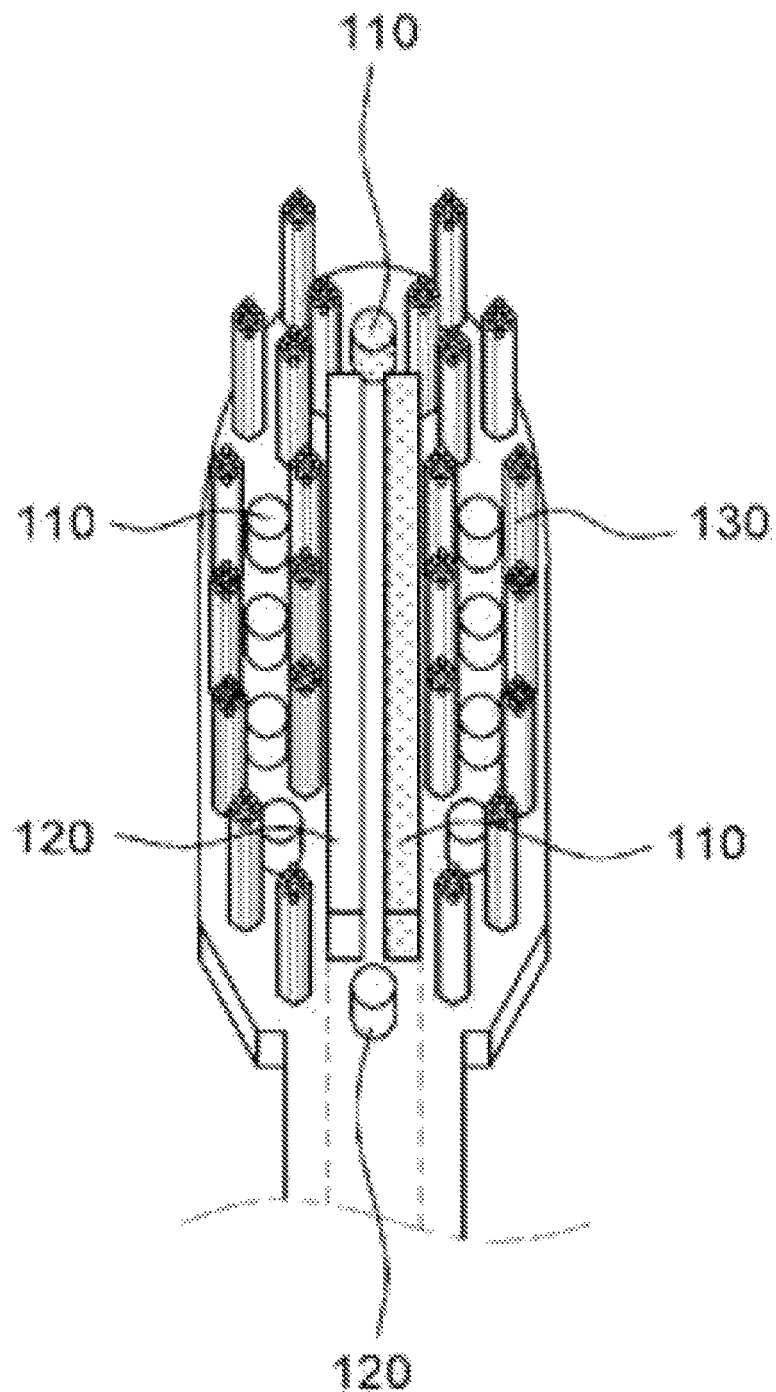

Referring to FIG. 2B together, the plurality of first electrodes 110 and the plurality of second electrodes 120 may be disposed on the head portion 100 to be spaced apart from each other at a predetermined interval. In this case, two electrodes may be disposed on the head portion 100 at an interval of 0.1 to 20 mm. Furthermore, the height of pillars may be 1 to 20 mm, and the width or diameter of the pillars may be 0.1 to 10 mm. Meanwhile, the first electrode 110 and the second electrode 120 may respectively have a circular pillar structure and a rectangular pillar structure, and may be arranged symmetrically to each other. More specifically, the first electrode 110 and the second electrode 120 having the rectangular pillar structure are disposed at the center of the head portion 100, and the plurality of first electrodes 110 and the plurality of second electrodes 120 having the circular pillar structure are disposed to surround the electrodes having the rectangular pillar structure, that is, disposed along the peripheral portion of the head portion 100. With such structural feature, a high electric field density can be maintained in the toothbrush. Furthermore, the plurality of bristles 130 may be formed in regions different from the region in which the two types of electrodes are disposed.

Referring back to FIG. 2A, the voltage supply unit 210 connected to the first electrode 110 and the second electrode 120, and the control unit 220 for controlling the energy thereof are formed in the handle portion 200.

In this case, the voltage supply unit 210 may be configured to apply both an AC voltage and a DC voltage to the electrically connected first electrode 110 and/or the second electrode 120. Accordingly, two types of electric fields according to the voltage supply may be applied to the teeth.

The control unit 220 may control the voltage of the voltage supply unit 210. For example, the control unit 220 may control the total amount of energy to 1 nJ to 10 nJ, which is provided to the teeth through the application of the AC voltage and the DC voltage by the voltage supply unit 210.

Meanwhile, the structure of the toothbrush 1000 for promoting plaque removal according to an embodiment of this invention is not limited thereto.

Figure 2C:
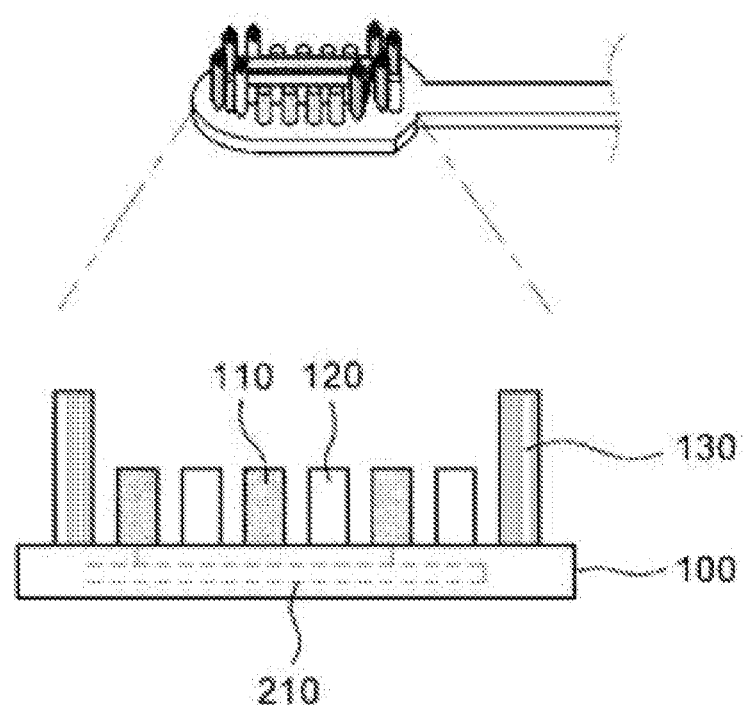

Referring to FIG. 2C, the voltage supply unit 210 may be formed inside the head portion 100. In this regard, the voltage supply unit 210 may be connected to the ends of the first electrode 110 and/or the second electrode 120 disposed on the top surface of the head portion 100 so as to apply the DC voltage together with the AC voltage thereto. Meanwhile, the height of the bristle portion 130 may be greater than those of the first electrode 110 and the second electrode 120. Thereby, the feeling of irritation caused by the electrode may be reduced. However, the heights of the first electrode 110, the second electrode 120, and the bristle portion 130 are not limited thereto, and may be variously set according to a target region to which the electric field is applied.

Figure 2D:
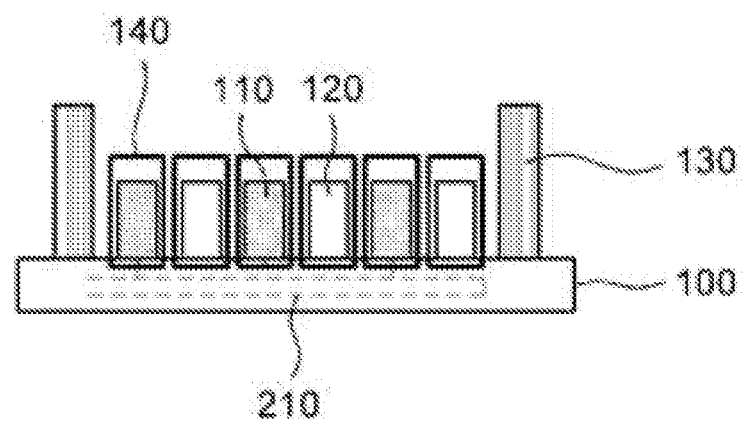

Referring to FIG. 2D, insulating layers 140 surrounding the first electrode 110 and the second electrode 120 from the outside may be further formed, so that the first electrode 110 and the second electrode 120 can have high stability even in friction with the teeth. In this case, the insulating layer 140 may be formed of at least one selected from a group including, but not limited to, Al2O3, SiO2, Si3N4, silicone, Teflon, and plastic. Furthermore, the insulating layer 140 may be configured to cover some surfaces of the voltage supply unit 210 from the outside.

Meanwhile, in the toothbrush for promoting plaque removal according to an embodiment of this invention, the shape and arrangement of the first electrode and the second electrode are not limited to those described above and may be diversely varied as long as the electric field is stably applied.

The toothbrush for promoting plaque removal according to an embodiment of this invention may provide a plaque removal effect by applying an electric field to the teeth with high efficiency due to the structural features as described above.

Figure 3A:
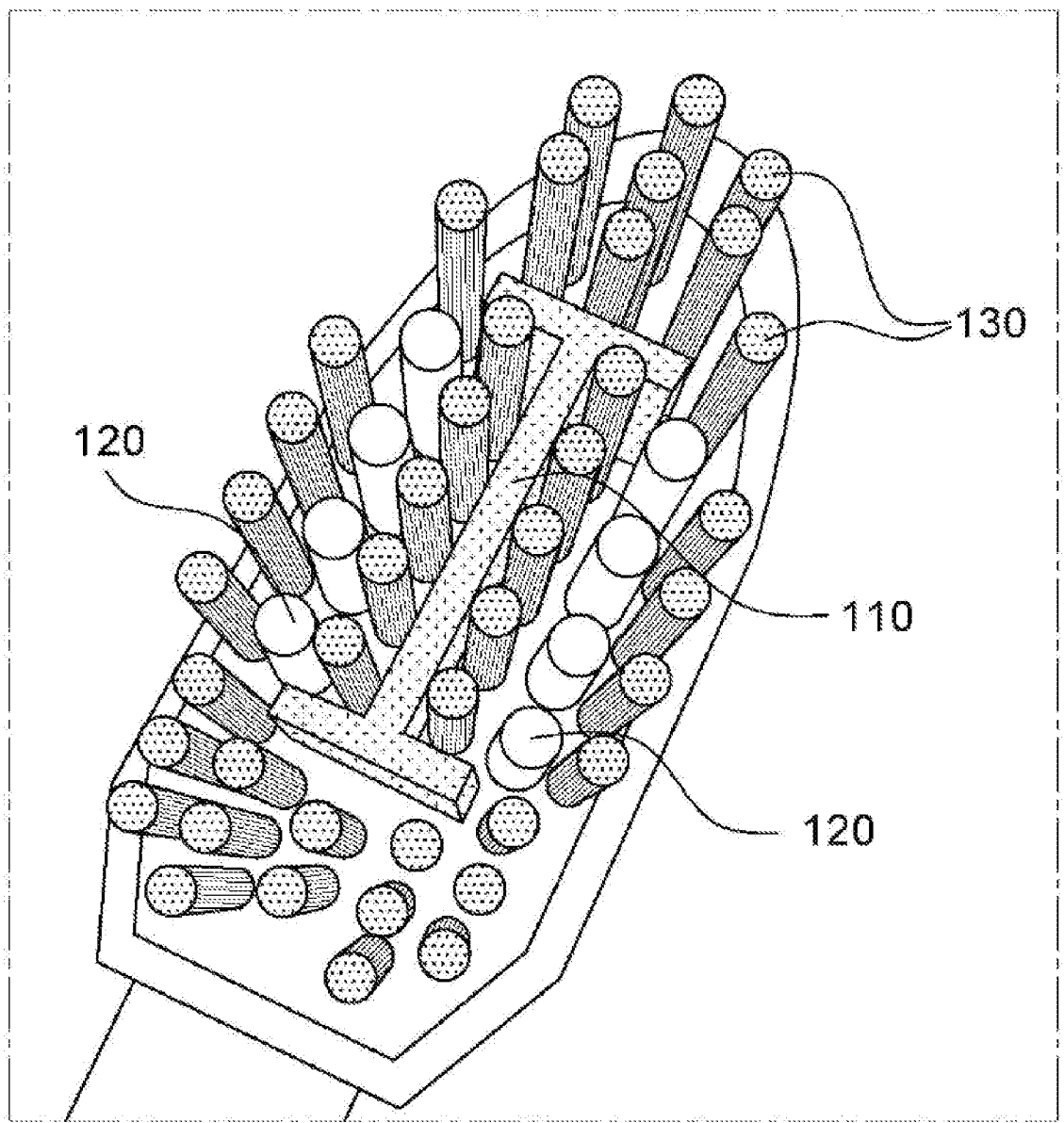
FIGS. 3A to 3C show, by way of example, configurations of toothbrushes for promoting plaque removal according to another embodiment of this invention.
Figure 3B:
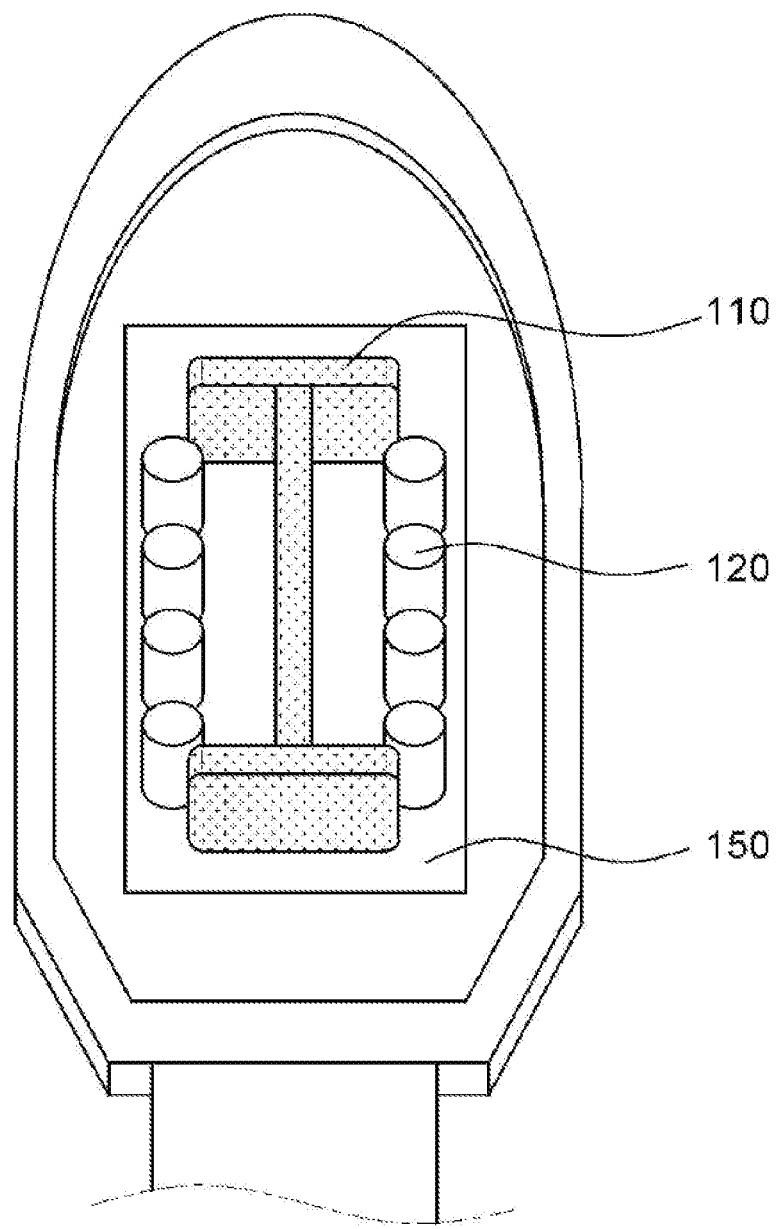
Figure 3C:
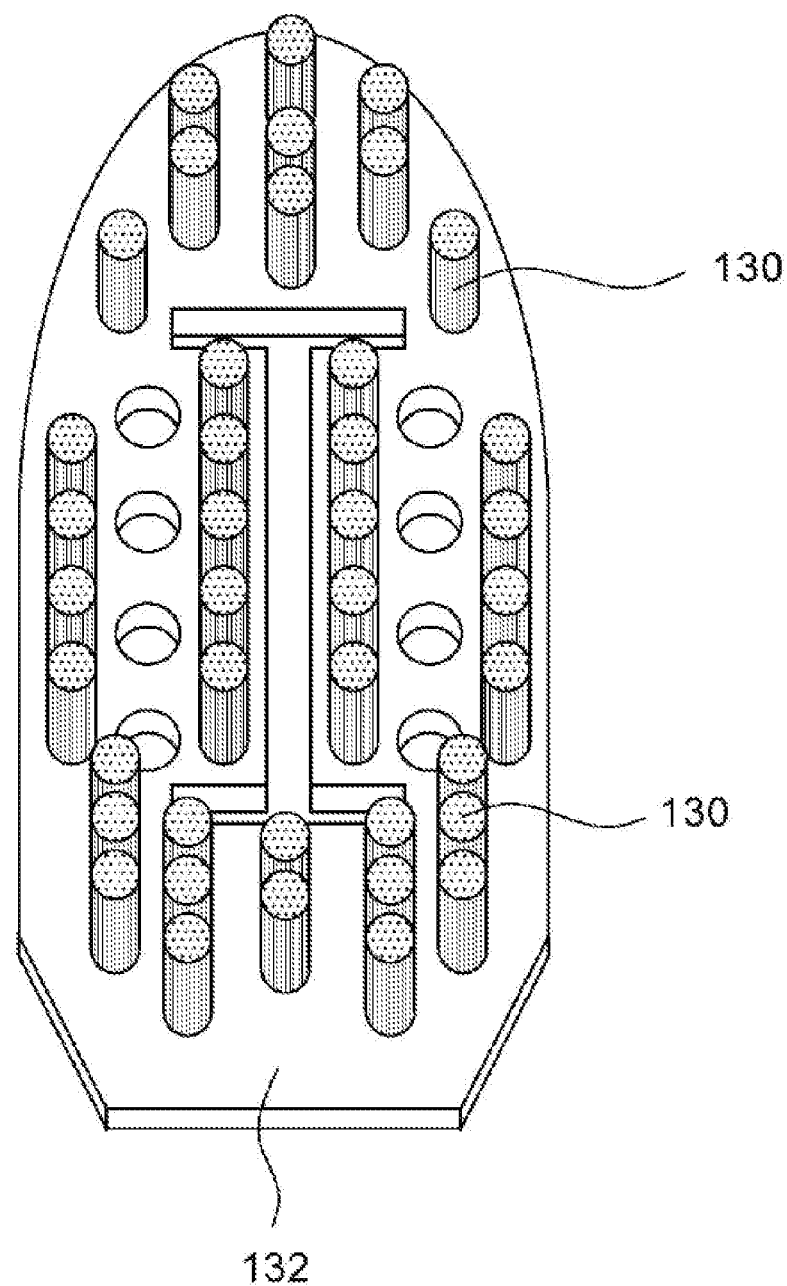

Hereinafter, with reference to FIGS. 3A to 3C, the structure of the toothbrush for promoting plaque removal according to another embodiment of this invention will be described. FIGS. 3A to 3C show, by way of example, configurations of toothbrushes for promoting plaque removal according to another embodiment of this invention.

Referring to FIG. 3A, the first electrode 110, the second electrode 120, and the bristle portion 130 may be disposed on the top surface of the head portion 100.

Referring to FIG. 3B together, the first electrode 110 and the second electrode 120 may be formed on the substrate 150 previously disposed on the head portion 100. In this case, the substrate may be at least one selected from a group including, but limited to, a printed circuit board (PCB), a printed wiring board (PWB), and a flexible PCB (FPCB).

More specifically, the first electrode 110 may have a structure of a rectangular pillar in which the length of one side surface is greater than that of another side surface, and the three first electrodes 110 may be disposed on the substrate 150 in an I-shape. Meanwhile, the plurality of grounded second electrodes 120 may have circular pillar structures, and may be disposed on opposite sides of the first electrode 110 at the center.

Referring further to FIG. 3C, the plurality of bristle portion 130 may be disposed on a detachable part 132 having the same area as the head portion 100. In this case, the detachable part 132 may have openings corresponding to the diameters (lengths or widths) of the first electrode 110 and the second electrode 120 and the arrangement of these electrodes. Accordingly, the bristle portion 130 can be more stably disposed on the head portion 100. Meanwhile, the detachable bristle portion 130 can be replaced more easily when it is damaged due to friction with the teeth.

Meanwhile, in the toothbrush for promoting plaque removal according to another embodiment of this invention, the shape and arrangement of the first electrode and the second electrode are not limited to those described above and may be diversely varied as long as the electric field is stably applied.

The toothbrush for promoting plaque removal according to another embodiment of this invention may provide a plaque removal effect by applying an electric field to the teeth with high efficiency due to the structural features as described above.

Figure 4:
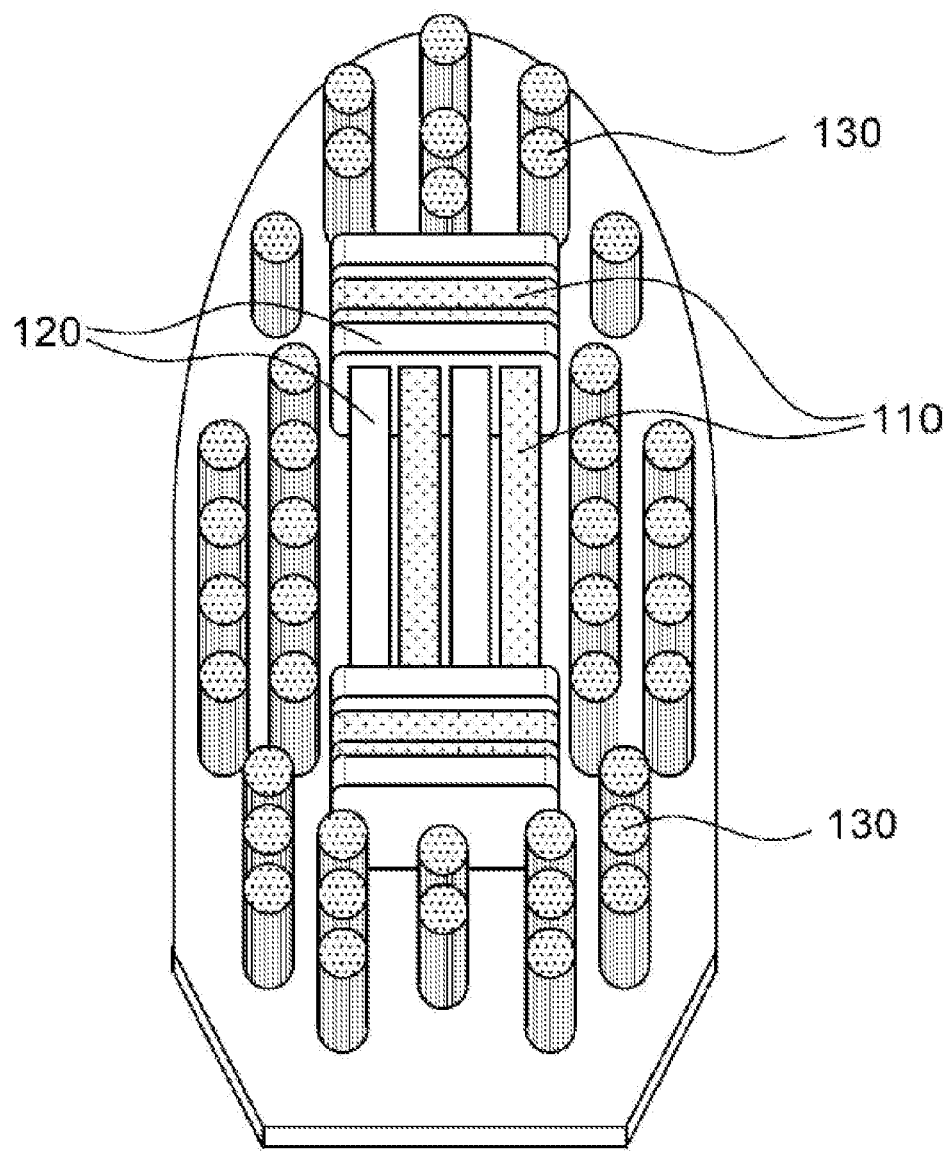
FIGS. 4, 5A and 5B show, by way of example, configurations of toothbrushes for promoting plaque removal according to still another embodiment of this invention.
Figure 5A:
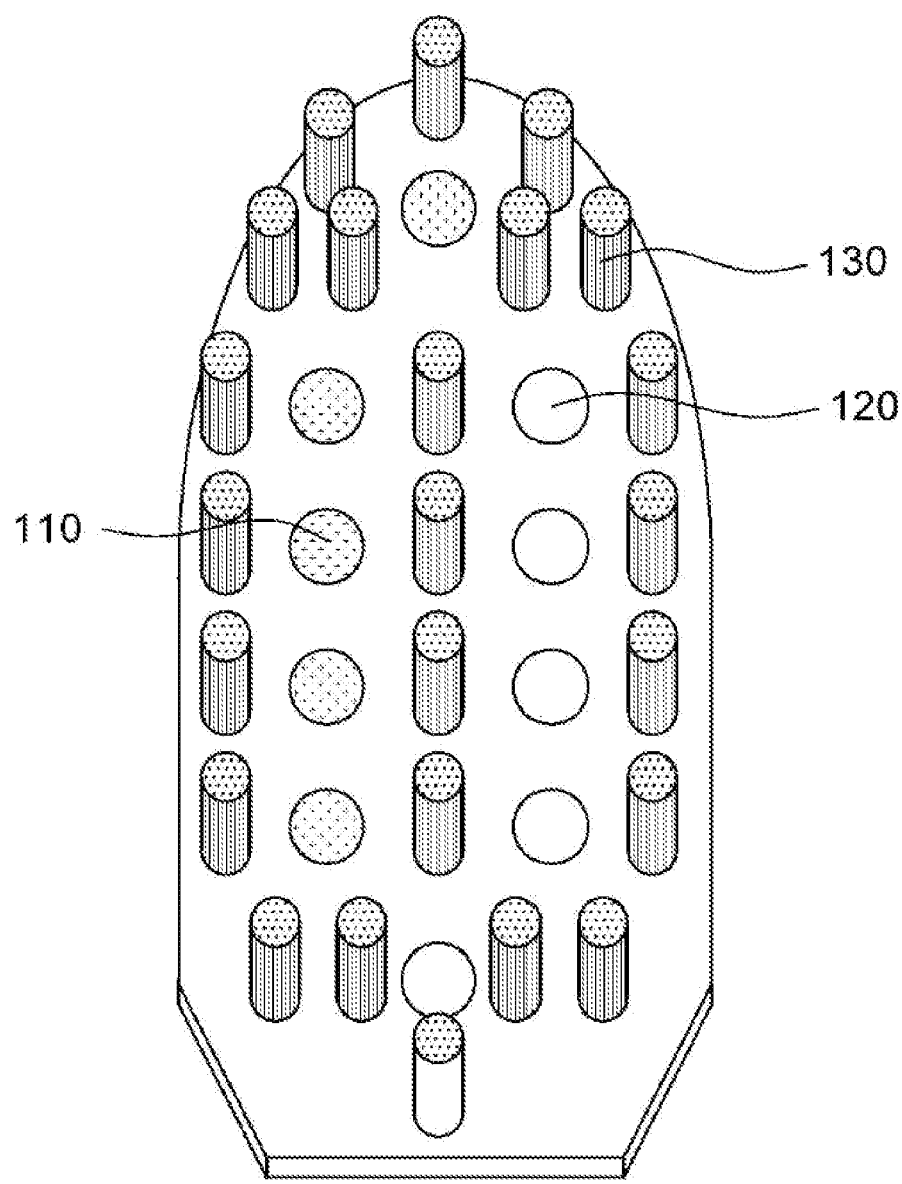
Figure 5B:
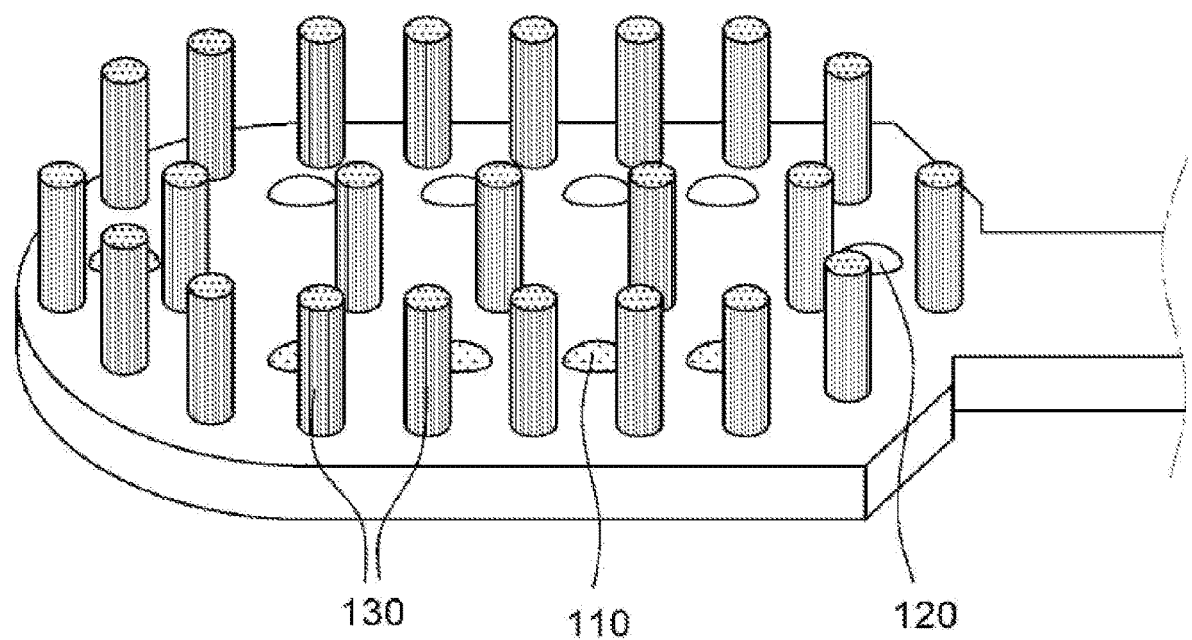

Hereinafter, with reference to FIGS. 4, 5A and 5B, the structure of the toothbrush for promoting plaque removal according to still another embodiment of this invention will be described. FIGS. 4, 5A and 5B show, by way of example, configurations of toothbrushes for promoting plaque removal according to still another embodiment of this invention.

First, referring to FIG. 4, on the top surface of the head portion 100, the plurality of first electrodes 110 and the plurality of second electrodes 120 having rectangular pillar structures may be disposed at the center of the head portion 100. More specifically, in the upper end of the head portion 100, the first electrode(s) 110 and the second electrode(s) 120 having rectangular pillar structures may be disposed to be spaced apart from each other at regular intervals in a direction perpendicular to the long axis of the head portion 100. Additionally, in the center of the head portion 100, the first electrode(s) 110 and the second electrode(s) 120 having rectangular pillar structures may be disposed to be spaced apart from each other at regular intervals in a direction parallel to the long axis of the head portion 100. Additionally, in the lower end of the head portion 100, the first electrode(s) 110 and the second electrode(s) 120 having rectangular pillar structures may be disposed to be spaced apart from each other at regular intervals in a direction perpendicular to the long axis of the head portion 100. Furthermore, the bristle portion 130 may be disposed on the head portion 100 in a region different from those of the first electrode 110 and the second electrode 120.

That is, as the plurality of first electrodes 110 and second electrodes 120 having rectangular pillar structures form a pattern, the toothbrush for promoting plaque removal according to another embodiment of this invention can maintain a high electric field density.

Next, referring to FIGS. 5A and 5B, the first electrodes 110 and the second electrodes 120 having a hemispherical pillar shape with a concave upper surface may be disposed on the head portion 100. More specifically, the plurality of first electrodes 110 having the hemispherical pillar shape may be disposed along one side of the peripheral portion of the head portion 100, while the plurality of second electrodes 120 may be disposed along the remaining side of the peripheral portion of the head portion 100. That is, the two electrodes may be formed on the head portion 100 in a structure symmetrical to each other. In this case, the bristle portion 130 may be disposed on the head portion 100 in a region different from those of the first electrode 110 and the second electrode 120.

Meanwhile, the first electrode 110 and the second electrode 120 having the hemispherical pillar shape with the concave upper surface may be disposed on the head portion 100 together with the electrode 110 and the second electrode 120 having the circular pillar or rectangular pillar structure. By disposing the electrodes having such various structures, the limitation of the spatial distribution of the electric field can be overcome.

In this regard, the arrangement of the first electrode 110 and the second electrode 120 is not limited to the above-described ones.

Hereinafter, with reference to FIGS. 6A-6G, the structure of the first electrode and the second electrode of the toothbrush according to various embodiments of this invention and an arrangements thereof will be described. FIGS. 6A-6G show, by way of example, the arrangements of the first electrodes and the second electrodes in the configurations of toothbrushes for promoting plaque removal according to various embodiments of this invention.

Figures 6A, 6B, 6C, 6D:
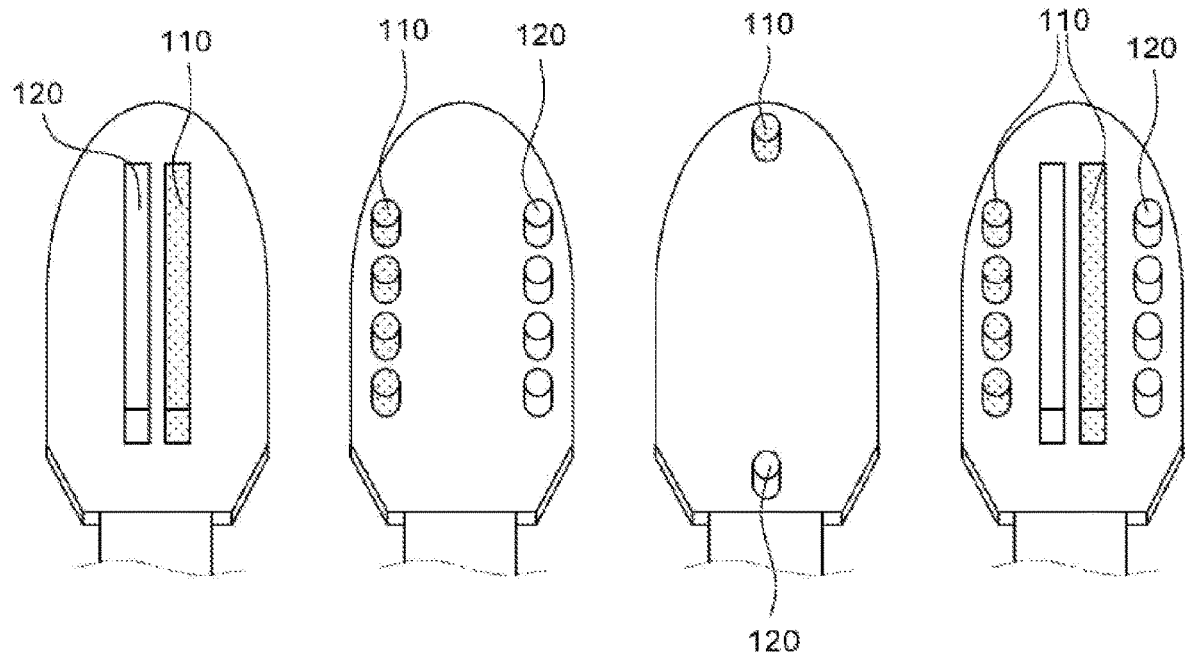
FIGS. 6A-6G show, by way of example, the arrangements of the first electrodes and the second electrodes in the configurations of toothbrushes for promoting plaque removal according to various embodiments of this invention.
Figures 6E, 6F, 6G:
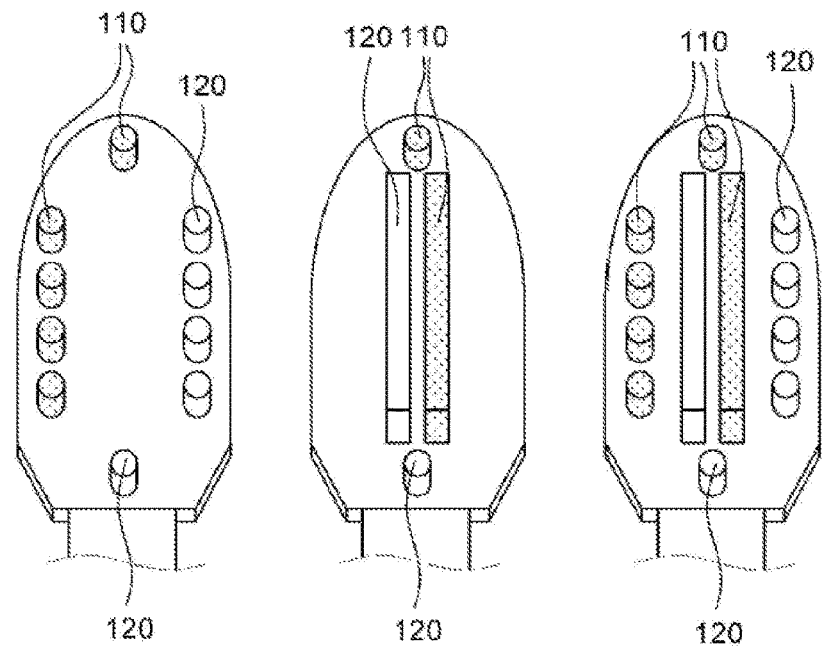

Referring to FIG. 6A, the first electrode 110 and the second electrode 120 may have rectangular pillar structures in which the length of one side surface is greater than that of another side surface, and may be respectively disposed at the center of the head portion 100. Referring to FIG. 6B, the first electrode 110 and the second electrode 120 may have a plurality of circular pillar structures identical to each other, and these electrodes may be disposed on the peripheral portion of the head portion 100 at predetermined intervals except for the upper portion and the lower portion of the head portion. Referring to FIG. 6C, the first electrode 110 and the second electrode 120 may be electrodes having the circular pillar structures identical to each other, and may be respectively disposed on the upper and lower portions of the head portion 100 at a predetermined interval. Referring to FIG. 6D, the first electrodes 110 and the second electrodes 120 may have a plurality of circular pillar structures identical to each other and a plurality of rectangular pillar structures identical to each other. In this case, the first electrodes 110 and the second electrodes 120 having the circular structures may be disposed on the opposite side peripheral portions of the head portion 100 at regular intervals from each other, and the first electrode 110 and the second electrode 120 having the rectangular pillar structures may be disposed at the center of the head portion 100. Referring to FIG. 6E, the first electrode 110 and the second electrode 120 may have a plurality of circular pillar structures identical to each other, and may be disposed on the upper, lower and opposite side peripheral portions of the head portion 100 at predetermined intervals. Referring to FIG. 6F, the first electrode 110 and the second electrode 120 may have circular pillar structures identical to each other or rectangular pillar structures identical to each other. In this case, the first electrode 110 and the second electrode 120 having the circular structures may be respectively disposed on the upper and lower portions of the head portion 100, and the first electrode 110 and the second electrode 120 having the rectangular pillar structures may be disposed at the center of the head portion 100. Referring to FIG. 6G, the first electrodes 110 and the second electrodes 120 may have a plurality of circular pillar structures identical to each other and a plurality of rectangular pillar structures identical to each other. In this case, the first electrodes 110 and the second electrodes 120 having the circular structures may be disposed on the upper, lower and opposite side peripheral portions of the head portion 100 at regular intervals from each other, and the first electrode 110 and the second electrode 120 having the rectangular pillar structures may be disposed at the center of the head portion 100.

In this case, the diameter or width of the first electrode 110 and the second electrode 120 having a circular pillar structure and a rectangular pillar structure may be 0.1 to 10 mm. Furthermore, the heights of the first electrode 110 and the second electrode 120 may be 1 to 20 mm, and the spacing therebetween may be 0.1 to 20 mm.

The toothbrushes for promoting plaque removal according to various embodiments of this invention having the above-described electrode arrangements disclosed in (a) to (g) of FIG. 6 can have a higher density of an electric field than toothbrushes having other structures, and the electric field can be more efficiently applied to the teeth, thereby effectively promoting plaque removal. Meanwhile, the arrangement of the first electrode 110 and the second electrode 120 is not limited to the above-described ones, but it may be diversely varied as long as a voltage of 0.82V or less is generated, and an electric field of 1.25 V/Cm or less is applied to a tooth.

Figure 7:
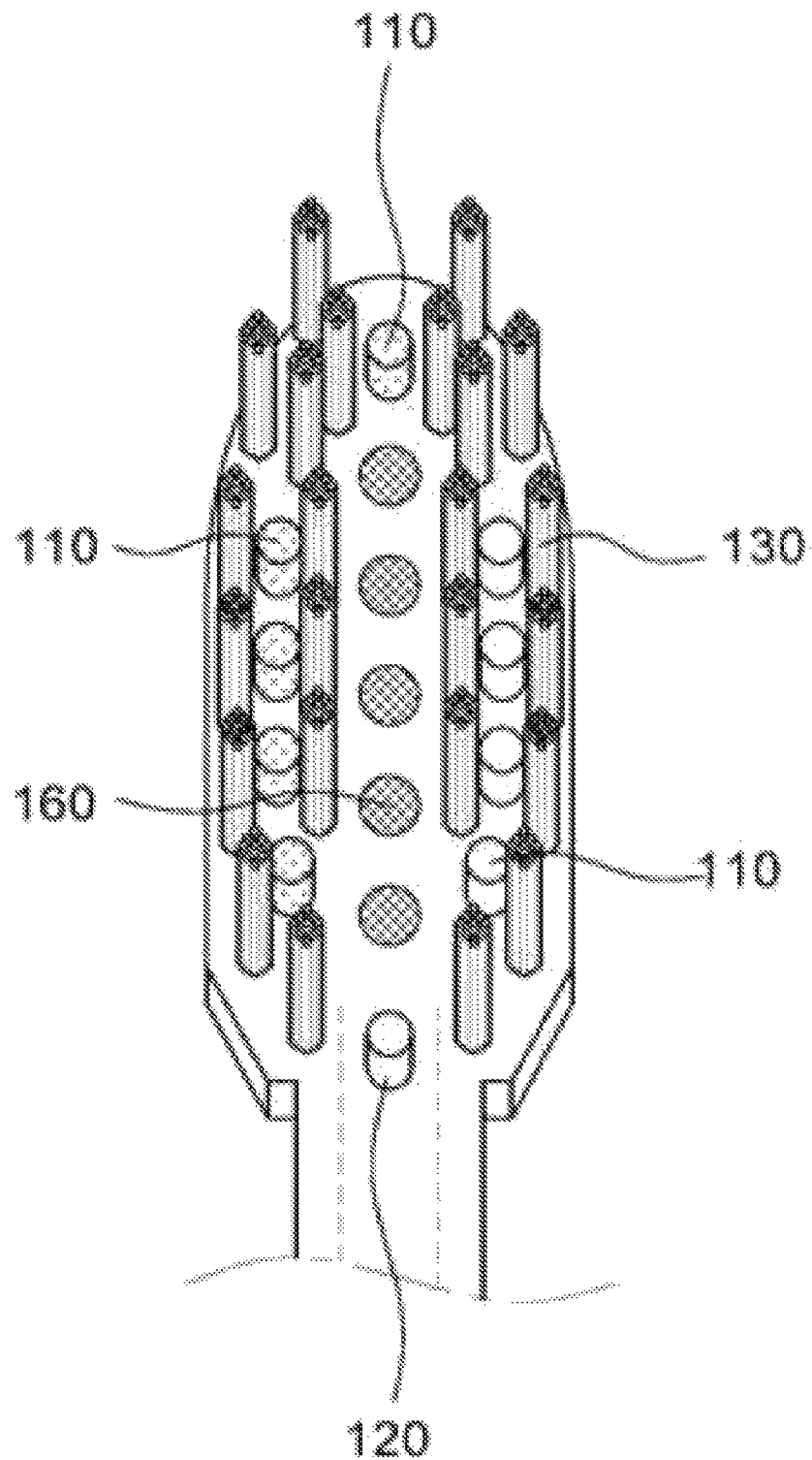
FIG. 7 shows, by way of example, configurations of toothbrushes for promoting plaque removal according to still another embodiment of this invention.

Hereinafter, with reference to FIG. 7, the structure of a plaque removing toothbrush according to still another embodiment of this invention will be described. FIG. 7 shows, by way of example, configurations of toothbrushes for promoting plaque removal according to still another embodiment of this invention.

Referring to FIG. 7, the plurality of first electrodes 110 and the plurality of second electrodes 120 may be disposed on the head portion 100 to be spaced apart from each other at a predetermined interval. In this case, two electrodes may be disposed on the head portion 100 at an interval of 0.1 to 20 mm. Furthermore, the height of pillars may be 1 to 20 mm, and the width or diameter of the pillars may be 0.1 to 10 mm. Meanwhile, the first electrode 110 and the second electrode 120 may have circular pillar structures, and may be arranged symmetrically to each other. In this case, the light irradiator 160 is disposed at the center of the head portion 100, so that the light can be irradiated to the teeth and provide whitening effect. More specifically, the light irradiator 160 may be disposed at the center of the head portion 100, and the plurality of first electrodes 110 and the plurality of second electrodes 120 having circular pillar structures are disposed to surround the light irradiator 160. With this structural feature, not only an electric field is applied to the tooth surface, but also light can be irradiated. Meanwhile, the plurality of bristle portions 130 may be formed in regions different from the regions where the two types of electrodes are disposed, and further, the regions where the light irradiators 160 are disposed.

Meanwhile, the light irradiator 160 may be an LED (Light-Emitting Diode), but is not limited thereto. Further, the light irradiator may be disposed at more various positions in the head portion 100 as long as the light from it can be irradiated to the teeth.

Figure 8:
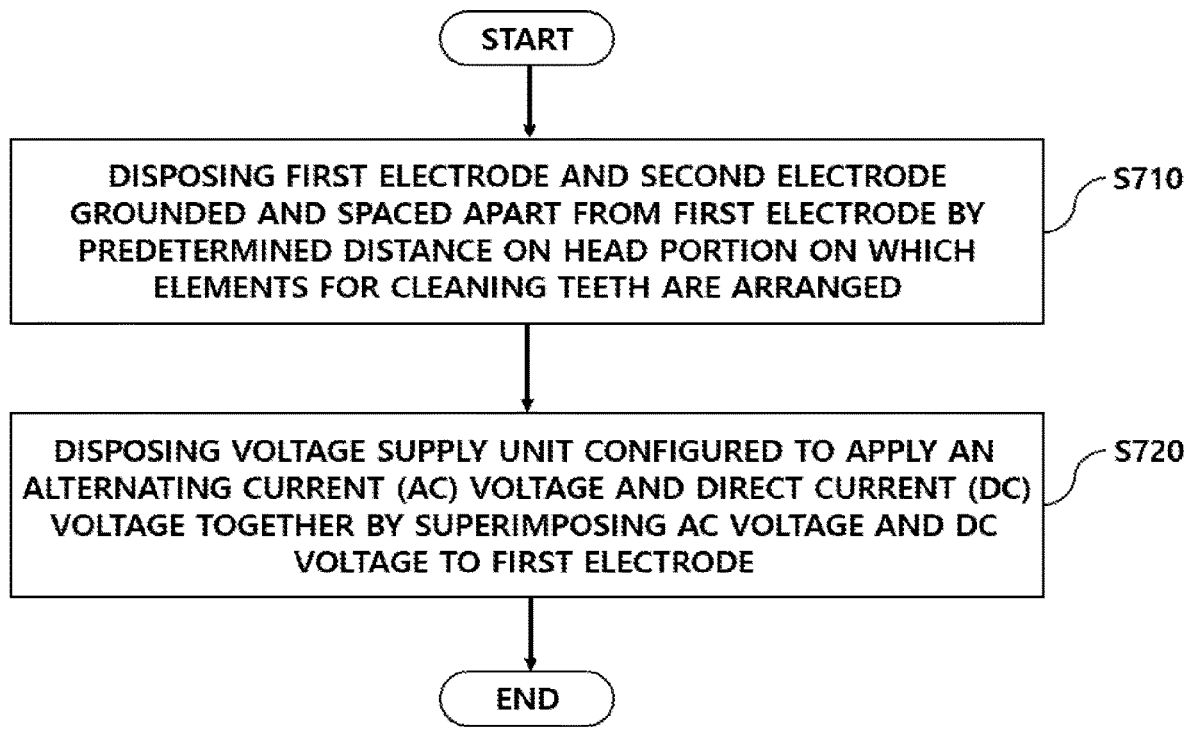
FIG. 8 shows a process of a method of manufacturing a toothbrush for promoting plaque removal according to an embodiment of this invention.

Hereinafter, with reference to FIG. 8, a process of a method of manufacturing a toothbrush for promoting plaque removal according to an embodiment of this invention will be described in detail. FIG. 8 shows a process of a method of manufacturing a toothbrush for promoting plaque removal according to an embodiment of this invention.

The method of manufacturing a toothbrush for promoting plaque removal includes, first, disposing a first electrode having a positive charge and a second electrode spaced apart from the first electrode by a predetermined distance and having conductivity on a head portion on which elements for cleaning teeth are arranged (S710). Then, a voltage supply unit configured to apply an alternating current (AC) voltage or a direct current (DC) voltage to the first electrode is disposed (S720).

More specifically, in the step of disposing the first electrode and the second electrode (S710), the first electrode and the second electrode may be disposed on the head portion at an interval of 0.1 to 20 mm.

According to a feature of this invention, in the step of disposing the first electrode and the second electrode (S710), at least one substrate of a printed circuit board (PCB), a printed wiring board (PWB), and a flexible PCB (FPCB) may be disposed on the head portion, and the first electrode and the second electrode may be disposed on the at least one substrate.

According to another feature of this invention, the first electrode and the second electrode may have pillar structures respectively that are identical or not identical to each other, and, in the step of disposing the first electrode and the second electrode (S710), a plurality of first electrodes and a plurality of second electrodes may be arranged on the head portion at predetermined intervals.

According to still another feature of this invention, the number of the first electrodes may be plural, and the number of the second electrodes may be plural. In this case, at least one of the plurality of first electrodes and at least one of the plurality of second electrodes have rectangular pillar structures in which one side surface has a length greater than that of another side surface, while the remaining electrodes of the plurality of first electrodes and the remaining electrodes of the plurality of second electrodes may have circular pillar structures. In this case, in the step of disposing the first electrode and the second electrode (S710), the first electrode and the second electrode having the rectangular pillar structure may be respectively disposed at the center of the head portion, while the first electrode and the second electrode having the circular pillar structure may be respectively disposed on the peripheral portion of the head portion.

According to still another feature of this invention, the first electrode and the second electrode may have rectangular pillar structures in which the length of one side surface is greater than the length of another side surface. In this case, in the step of disposing the first electrode and the second electrode (S710), the first electrode and the second electrode having the rectangular pillar structures identical to each other may be respectively disposed at the center of the head portion.

According to still another feature of this invention, the number of the first electrodes may be plural, and the number of the second electrodes may be plural, and the first electrode and the second electrode have circular pillar structures identical to each other. In this case, in the step of disposing the first electrode and the second electrode (S710), the first electrode and the second electrode having the circular pillar structures identical to each other may be respectively disposed on the peripheral portion of the head portion at a predetermined interval.

According to still another feature of this invention, one of the first electrode or the second electrode may have a rectangular pillar structure in which the length of one side surface is greater than that of another side surface, and the other one of the first electrode or the second electrode may have a circular pillar structure. In this case, in the step of disposing the first electrode and the second electrode (S710), one of the first electrode and the second electrode having the rectangular pillar structure may be disposed at the center of the head portion, while the other one of the first electrode and the second electrode having the circular pillar structure may be disposed on the peripheral portion of the head portion.

Meanwhile, after the step of disposing the first electrode and the second electrode (S710), a bristle portion having a height greater than that of the first electrode or the second electrode may be disposed in a region on the head portion different from those of the first electrode and the second electrode.

In this case, the bristle portion may be detachable on the head portion.

Then, in the step of disposing the voltage supply unit (S720), the voltage supply unit configured to apply an alternating current (AC) voltage and a direct current (DC) voltage to the first electrode may be disposed in the head portion of the toothbrush or the handle portion from which one end of the head portion of the toothbrush extends.

According to still another feature of this invention, after the step of disposing the voltage supply unit (S720), the step of surrounding the first electrode, the second electrode, and at least some surfaces of the voltage supply unit from the outside with the insulating layer may be further performed.

In this case, the insulating layer may be formed of at least one of $Al_2O_3$, $SiO_2$, $Si_3N_4$, silicone, Teflon, and plastic.

Although the embodiments of this invention have been described in more detail with reference to the accompanying drawings, this invention is not necessarily limited to such embodiments, but various modifications may be made within the scope without departing from the spirit of this invention.

Accordingly, the embodiments disclosed in this invention are not for limiting, but for explaining the technical spirit of this invention, and the scope of the technical spirit of this invention is not limited by these embodiments. Accordingly, it should be understood that the embodiments described above are illustrative in all respects and not restrictive. The protection scope of this invention should be construed by the following claims, and all technical ideas within the scope equivalent thereto should be construed as being included in the scope of this invention.

The invention claimed is:

1. A toothbrush for promoting plaque removal, the toothbrush comprising:
    a head portion on which elements for cleaning teeth are arranged;
    a first electrode on the head portion;
    a second electrode on the head portion, wherein the second electrode is spaced apart from the first electrode by a predetermined distance, and is grounded; and
    a voltage supply unit configured to apply an alternating current (AC) voltage and a direct current (DC) voltage together by superimposing the AC voltage and the DC voltage on the first electrode,
    wherein the first electrode and the second electrode have pillar structures respectively that are identical or not identical to each other, and the first electrode and the second electrode are respectively arranged on the head portion at a predetermined interval,
    wherein the first electrode includes a plurality of first electrodes and the second electrode includes a plurality of second electrodes,
    wherein at least one of the plurality of first electrodes and at least one of the plurality of second electrodes have rectangular pillar structures in which one side surface has a length greater than a length of another side surface, and are disposed at the center of the head portion, and
    wherein a remaining electrode of the plurality of first electrodes and a remaining electrode of the plurality of second electrodes have circular pillar structures, and are respectively disposed on a peripheral portion of the head portion.

2. The toothbrush for promoting plaque removal of claim 1, wherein a width or a diameter of each of the first electrode and the second electrode having the pillar structures is 0.1 to 10 mm.

3. The toothbrush for promoting plaque removal of claim 1, further comprising a bristle portion which is disposed in a different region on the head portion from regions of the first electrode and the second electrode, and which has a height greater than that of the first electrode or the second electrode.

4. The toothbrush for promoting plaque removal of claim 1, wherein the predetermined distance is 0.1 to 20 mm, and
    wherein a height of the first electrode or the second electrode is 1 to 20 mm.

5. The toothbrush for promoting plaque removal of claim 1, further comprising a handle portion from which one end of the head portion extends,
    wherein the voltage supply unit is disposed on the handle portion.

6. The toothbrush for promoting plaque removal of claim 1, further comprising an insulating layer surrounding at least a partial surface of the first electrode or the second electrode from an outside,
    wherein the insulating layer is formed of at least one of $Al_2O_3$, $SiO_2$, $Si_3N_4$, silicone, Teflon, or plastic.

7. The toothbrush for promoting plague plaque removal of claim 1, further comprising a light irradiator disposed in a different region on the head portion from regions of the first electrode and the second electrode.

8. A toothbrush for promoting plaque removal, the toothbrush comprising:
    a head portion on which elements for cleaning teeth are arranged;
    a first electrode on the head portion;
    a second electrode on the head portion, wherein the second electrode is spaced apart from the first electrode by a predetermined distance, and is grounded; and
    a voltage supply unit configured to apply an alternating current (AC) voltage and a direct current (DC) voltage together by superimposing the AC voltage and the DC voltage on the first electrode,
    wherein the first electrode and the second electrode have pillar structures respectively that are identical or not identical to each other, and the first electrode and the second electrode are respectively arranged on the head portion at a predetermined interval, and
    wherein the first electrode and the second electrode have rectangular pillar structures identical to each other, in which a length of one side surface is greater than a length of another side surface, and are respectively disposed at the center of the head portion.

9. A toothbrush for promoting plaque removal, the toothbrush comprising:
    a head portion on which elements for cleaning teeth are arranged;
    a first electrode on the head portion;
    a second electrode on the head portion, wherein the second electrode is spaced apart from the first electrode by a predetermined distance, and is grounded; and
    a voltage supply unit configured to apply an alternating current (AC) voltage and a direct current (DC) voltage together by superimposing the AC voltage and the DC voltage on the first electrode,
    wherein the first electrode and the second electrode have pillar structures respectively that are identical or not identical to each other, and the first electrode and the second electrode are respectively arranged on the head portion at a predetermined interval, and
    wherein the first electrode includes a plurality of first electrodes and the second electrode includes a plurality of second electrodes, and the plurality of first electrodes and the plurality of second electrodes have circular pillar structures identical to each other, and are respectively disposed on a peripheral portion of the head portion at predetermined intervals.

10. A toothbrush for promoting plaque removal, the toothbrush comprising:
    a head portion on which elements for cleaning teeth are arranged;
    a first electrode on the head portion;
    a second electrode on the head portion, wherein the second electrode is spaced apart from the first electrode by a predetermined distance, and is grounded; and
    a voltage supply unit configured to apply an alternating current (AC) voltage and a direct current (DC) voltage together by superimposing the AC voltage and the DC voltage on the first electrode,
    wherein the first electrode and the second electrode have pillar structures respectively that are identical or not identical to each other, and the first electrode and the second electrode are respectively arranged on the head portion at a predetermined interval,
    wherein one of the first electrode or the second electrode has a rectangular pillar structure in which one side surface has a length greater than a length of another side surface, and is disposed at the center of the head portion, and wherein the other one of the first electrode and the second electrode has a circular pillar structure, and is disposed in a peripheral portion of the head portion.

11. A toothbrush for promoting plaque removal, the toothbrush comprising:
a head portion on which elements for cleaning teeth are arranged;
a first electrode on the head portion;
a second electrode on the head portion, wherein the second electrode is spaced apart from the first electrode by a predetermined distance, and is grounded; and
a voltage supply unit configured to apply an alternating current (AC) voltage and a direct current (DC) voltage together by superimposing the AC voltage and the DC voltage on the first electrode,
wherein the first electrode and the second electrode have pillar structures respectively that are identical or not identical to each other, and the first electrode and the second electrode are respectively arranged on the head portion at a predetermined interval, and
wherein each of the first electrode and the second electrode having the pillar structures has a concave top surface.

12. A method of manufacturing a toothbrush for promoting plaque removal, the method comprising:
disposing a first electrode and a grounded second electrode spaced apart from the first electrode by a predetermined distance on a head portion on which an element for cleaning teeth is arranged, and
disposing a voltage supply unit configured to apply an alternating current (AC) voltage and a direct current (DC) voltage together by superimposing the AC voltage and the DC voltage on the first electrode,
further comprising disposing a bristle portion in a different region on the head portion from regions of the first electrode and the second electrode after the disposing the second electrode,
wherein the bristle portion has a height equal to that of the first electrode or the second electrode, a height greater than that of the first electrode or the second electrode, or a height less than that of the first electrode or the second electrode.

13. A method of manufacturing a toothbrush for promoting plaque removal, the method comprising:
disposing a first electrode and a grounded second electrode spaced apart from the first electrode by a predetermined distance on a head portion on which an element for cleaning teeth is arranged, and disposing a voltage supply unit configured to apply an alternating current (AC) voltage and a direct current (DC) voltage together by superimposing the AC voltage and the DC voltage on the first electrode,
wherein the disposing the second electrode includes:
disposing at least one substrate of a printed circuit board (PCB), a printed wiring board (PWB), or a flexible PCB (FPCB) on the head portion; and
disposing the first electrode and the second electrode on the at least one substrate.

14. A method of manufacturing a toothbrush for promoting plaque removal, the method comprising:
disposing a first electrode and a grounded second electrode spaced apart from the first electrode by a predetermined distance on a head portion on which an element for cleaning teeth is arranged, and disposing a voltage supply unit configured to apply an alternating current (AC) voltage and a direct current (DC) voltage together by superimposing the AC voltage and the DC voltage on the first electrode,
wherein the first electrode and the second electrode have pillar structures respectively that are identical or not identical to each other,
wherein the first electrode includes a plurality of first electrodes and the second electrode includes a plurality of second electrodes, and
wherein the disposing the second electrode includes arranging each of the plurality of first electrodes and the plurality of second electrodes on the head portion at predetermined intervals.

15. The method of claim 14,
wherein at least one of the plurality of first electrodes and at least one of the plurality of second electrodes have rectangular pillar structures in which one side surface has a length greater than that of another side surface,
wherein a remaining electrode of the plurality of first electrodes and a remaining electrode of the plurality of second electrodes have circular pillar structures, and
wherein the disposing the second electrode includes:
disposing the at least one of the plurality of first electrodes and the at least one of the plurality of second electrodes having the rectangular pillar structures at the center of the head portion, respectively; and
disposing the remaining electrode of the plurality of first electrodes and the remaining electrode of the plurality of second electrodes having the circular pillar structures on a peripheral portion of the head portion, respectively.

16. The method of claim 14, wherein the first electrode and the second electrode have rectangular pillar structures in which one side surface has a length greater than that of another side surface,
wherein the disposing the second electrode includes disposing the first electrode and the second electrode having the rectangular pillar structures identical to each other at the center of the head portion, respectively.

17. The method of claim 14, wherein the first electrode includes a plurality of first electrodes and the second electrode includes a plurality of second electrodes, and the first electrode and the second electrode have circular pillar structures identical to each other, and
wherein the disposing the second electrode includes disposing the first electrode and the second electrode having the circular pillar structures identical to each other on a peripheral portion of the head portion at a predetermined interval, respectively.

18. The method of claim 14, wherein one of the first electrode or the second electrode has a rectangular pillar structure in which one side surface has a length greater than that of another side surface,
wherein the other one of the first electrode and the second electrode has a circular pillar structure, and
wherein the disposing the second electrode includes:
disposing one of the first electrode or the second electrode having the rectangular pillar structures at the center of the head portion; and
disposing the other one of the first electrode and the second electrode having the circular pillar structures on a peripheral portion of the head portion.

* * * * *